United States Patent [19]
Kato et al.

[11] Patent Number: 6,151,206
[45] Date of Patent: Nov. 21, 2000

[54] ELECTRONIC DEVICE

[75] Inventors: Masahiro Kato; Masahiko Suzuki; Makoto Tanahashi, all of Kanagawa, Japan

[73] Assignee: Sony Corporation, Tokyo, Japan

[21] Appl. No.: 09/162,204

[22] Filed: Sep. 28, 1998

[30] Foreign Application Priority Data

Sep. 29, 1997 [JP] Japan ..................................... 9-263886

[51] Int. Cl.⁷ .................................. G06F 1/16; H05K 7/16
[52] U.S. Cl. .......................... 361/681; 361/679; 361/682; 361/683; 364/708.1; 381/87; 381/88
[58] Field of Search ..................................... 361/679, 681, 361/682, 683; 364/708.1; 381/87, 88

[56] References Cited

U.S. PATENT DOCUMENTS

| | | | |
|---|---|---|---|
| 5,519,572 | 5/1996 | Luo | 361/685 |
| 5,608,863 | 3/1997 | Ishizawa et al. | 361/681 |
| 5,812,369 | 9/1998 | Hsu et al. | 361/683 |
| 5,852,545 | 12/1998 | Pan-Ratzlaff | 361/683 |

*Primary Examiner*—Leo P. Picard
*Assistant Examiner*—Hung Van Duong
*Attorney, Agent, or Firm*—Frommer Lawrence & Haug, LLP; William S. Frommer; Matthew K. Ryan

[57] ABSTRACT

A portable electronic device, which has an accessory provided at an external surface, around the display screen, of the display portion, the portable electronic device including a body; a display portion openably and closably provided with respect to the body; holding portion, provided at an external surface, around the display screen, of the display portion, for mechanically and removably holding the accessory; and electrically connecting portion for electrically and removably connecting the accessory.

7 Claims, 13 Drawing Sheets

FIG. 4
FIG. 5
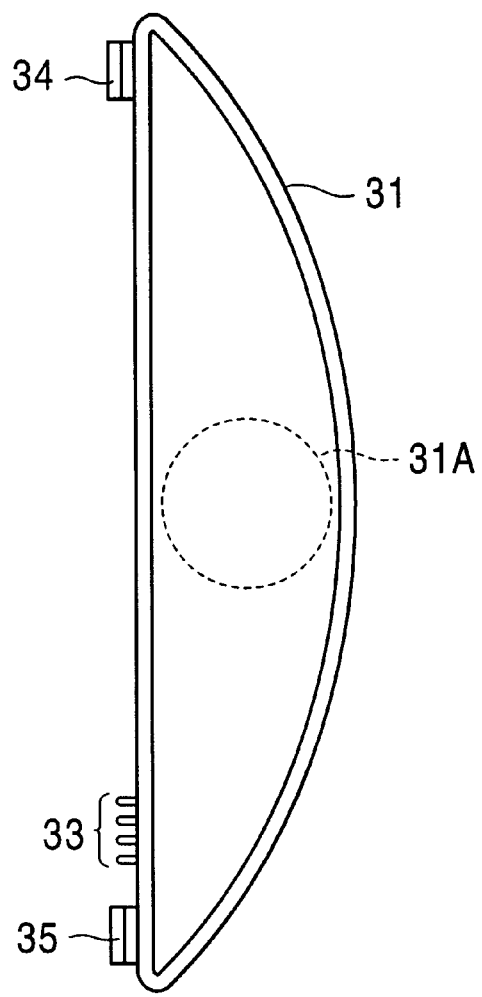
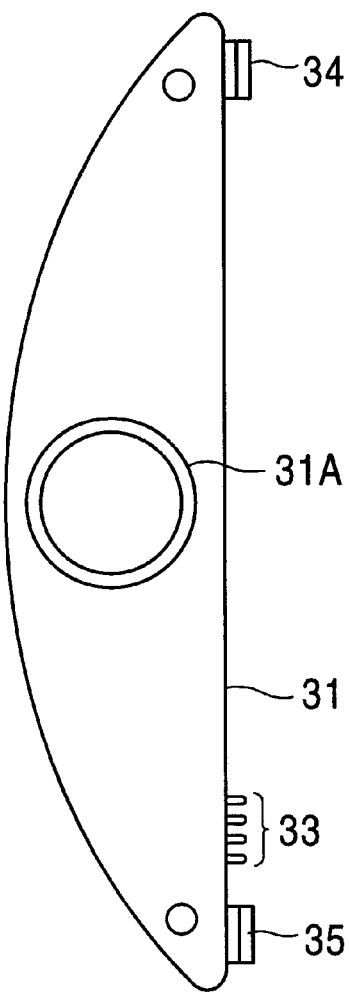

ELECTRONIC DEVICE

BACKGROUND OF THE INVENTION

1. Field of the Invention

The present invention relates to a portable electronic device comprising a body and a display portion which can be opened and closed with respect to the body.

2. Description of the Related Art

In recent years, many types of portable electronic devices have been on sale. Examples of portable electronic devices include portable computers and portable information terminals. Portable computers comprise a body and a display portion which can be opened and closed with respect to the body. There are cases where an accessory, such as a speaker or a microphone, needs to be mounted to such portable computers. In conventional computers, such accessories are used by placing them on a desk and connecting a connecting cord to the body of the conventional computers.

The display portion incorporates, for example, a liquid crystal display. However, nothing in particular is mounted to any of the external surfaces of the display portion.

Taking note of this fact, the present inventor et al. have discovered that required accessories can be removably mounted to external surfaces of a display portion.

SUMMARY OF THE INVENTION

Accordingly, it is an object of the present invention to provide a portable electronic device which allows accessories to be removably provided at external surfaces, around the display screen, of the display portion.

To this end, according to the present invention, there is provided a portable electronic device comprising a body; a display portion which can be opened and closed with respect to the body; holding means for mechanically and removably holding an accessory; and electrically connecting means for electrically and removably connecting the accessory; wherein the holding means and the electrically connecting means are provided at an external surface, around the display screen, of the display portion.

By virtue of such a construction, an accessory can be mechanically and removably held by a holding means at, and, at the same time, electrically and removably connected by an electrically connecting means to an external surface, around the display screen, of the display portion.

Although not exclusive, in a preferred form of the present invention the amount of protrusion of the protruding electrically connecting terminal of the accessory may be smaller than the amount of protrusion of a protrusion of the accessory. In this case, the protruding electrically connecting terminal of the accessory protects the protrusion of the accessory.

Although not exclusive, in another preferred form of the present invention, an electrically or magnetically insulated cover may be provided to cover a protruding magnet of the accessory. This can prevent the protruding magnet from electrically or magnetically affecting other devices or members.

BRIEF DESCRIPTION OF THE DRAWINGS

FIG. 4 is a front view of the right speaker, being used as example of the speaker.

FIG. 5 is a rear view of the right speaker.

DESCRIPTION OF THE PREFERRED EMBODIMENTS

A description will now be given of preferred embodiments of the present invention with reference to the attached drawings.

Since the embodiments to be described below are preferred embodiments of the present invention, various specific technological forms are described below. However, unless otherwise specified, these technological forms in no way limit the scope of the present invention.

Figure 1:
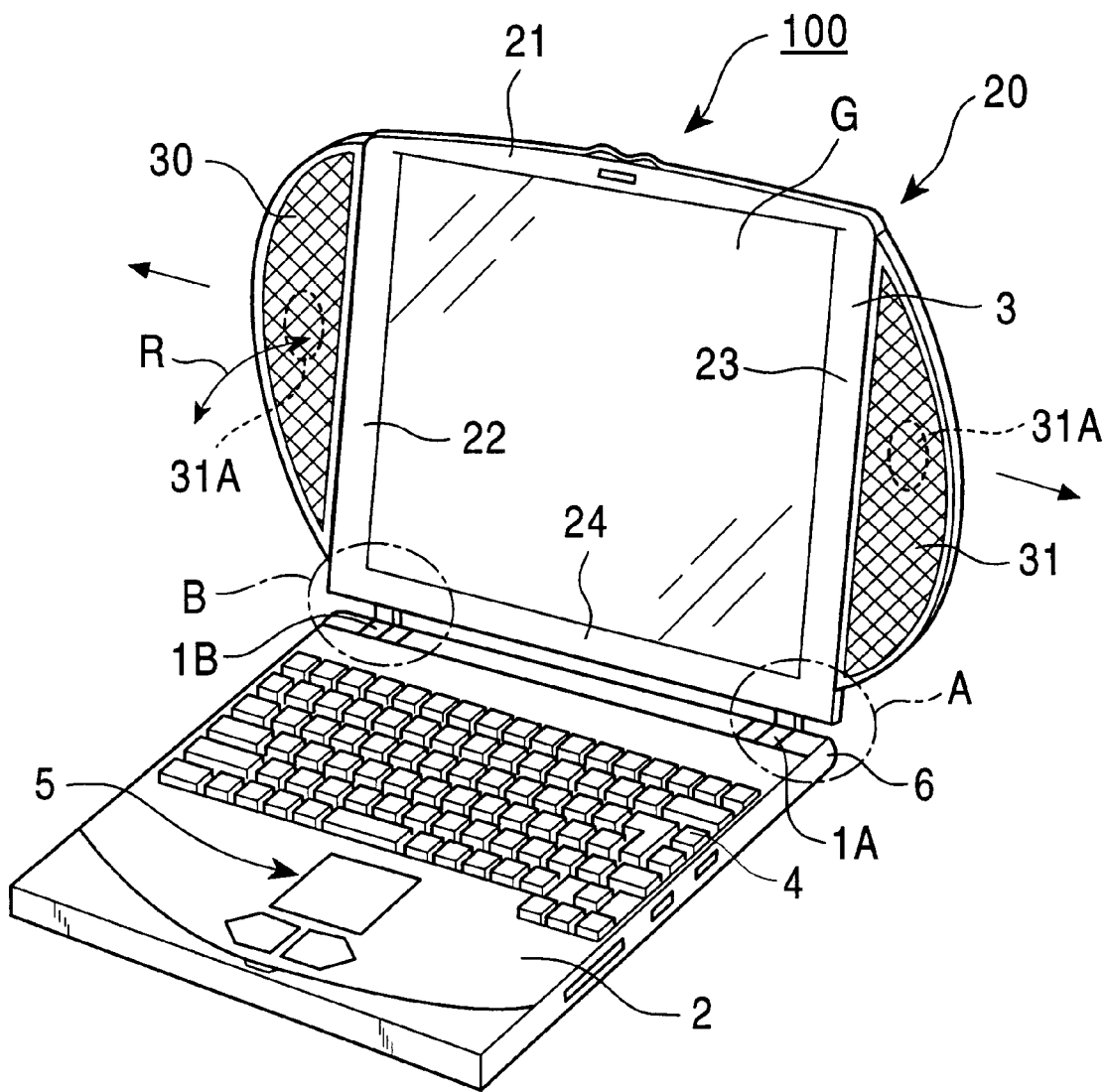
FIG. 1 is a perspective view of an embodiment of the portable electronic device in accordance with the present invention.

FIG. 1 illustrates an embodiment of the electronic device with hinges in accordance with the present invention. In FIG. 1, the portable computer 100 serves as the electronic device. The portable computer 100 comprises, for example, a body 2, a display portion 3, a keyboard 4, and hinges 1A and 1B surrounded by areas A and B, respectively.

The body 2 has the aforementioned keyboard 4, a pointing device 5, etc. A liquid crystal display (LCD) may be used for the display portion 3. Using the hinges 1A and 1B, the display portion 3 is mounted to the body 2 so that it can be opened and closed in the direction of double-headed arrow R. Although not illustrated in FIG. 1, a mouse, serving as external pointing means, or the like can be externally secured to the body 2.

The hinges 1A and 1B of FIG. 1 are capable of mechanically connecting the display portion 3 to a back end 6 of the body 2, as well as conducting and dissipating heat.

The hinges 1A and 1B are symmetrically formed on the left and right side portions of the electronic device, and have substantially the same structure.

Figure 2:
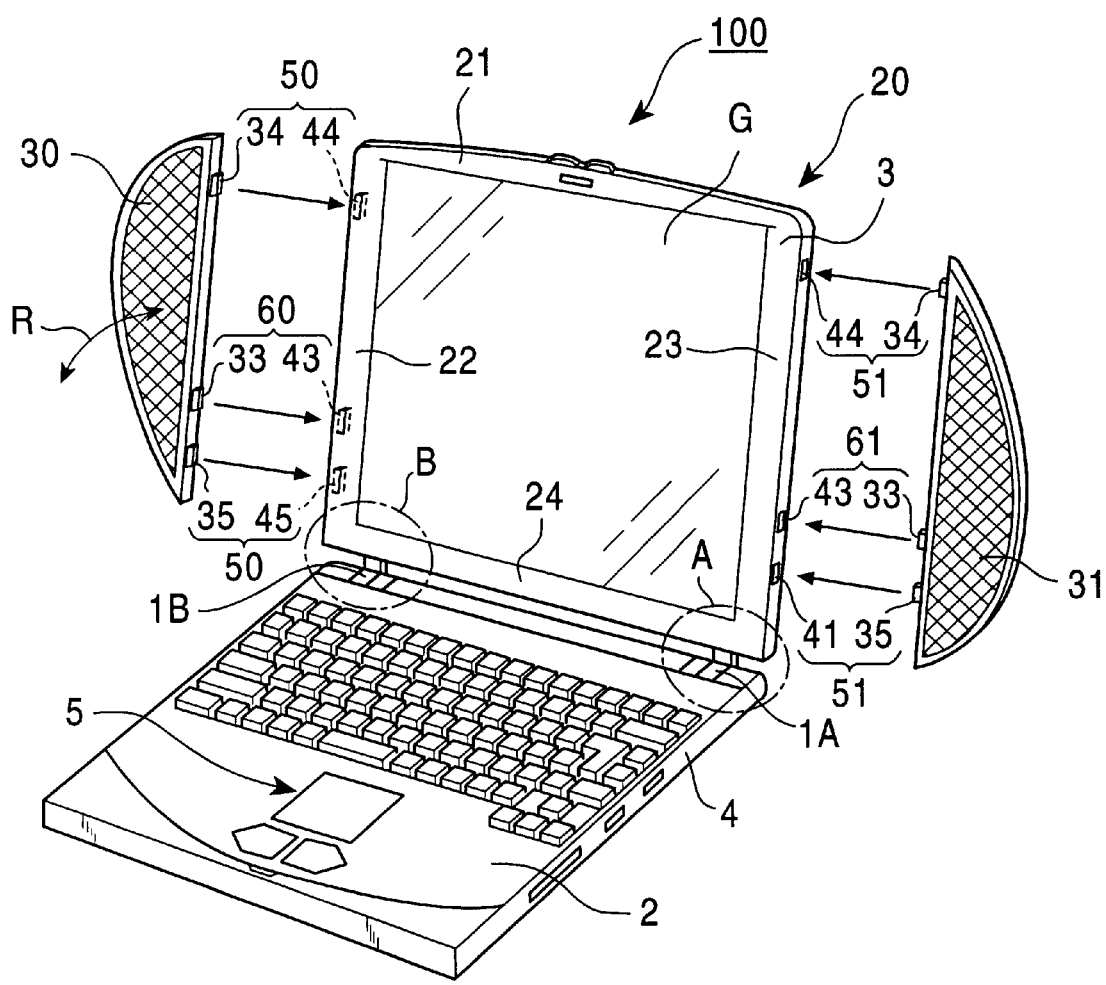
FIG. 2 illustrates the embodiment of the portable device, showing the accessories to be mounted to the display portion of the portable electronic device of FIG. 1.

As shown in FIGS. 1 and 2, an external surface portion 20 of the display portion 3 includes a top side 21, a left side 22, a right side 23, and a bottom side 24. The right side 21, the left side 22, the right side 23, and the bottom side 24 surround a screen G of the liquid crystal display. The external surface portion 20 of the display portion 3 is composed of, for example, plastic or metal.

As shown in FIGS. 1 and 2, a pair of stereo or monophonic speakers 30 and 31 are removably mounted to the left side 22 and the right side 23, respectively. The speakers 30 and 31 are a type of accessory. When the speakers 30 and 31, which are separated from the display portion 3 in FIG. 2, are mechanically fitted to the left side 22 and the right side 23, respectively, the speakers 30 and 31 and the display portion 3 are also electrically connected together.

Figure 3:
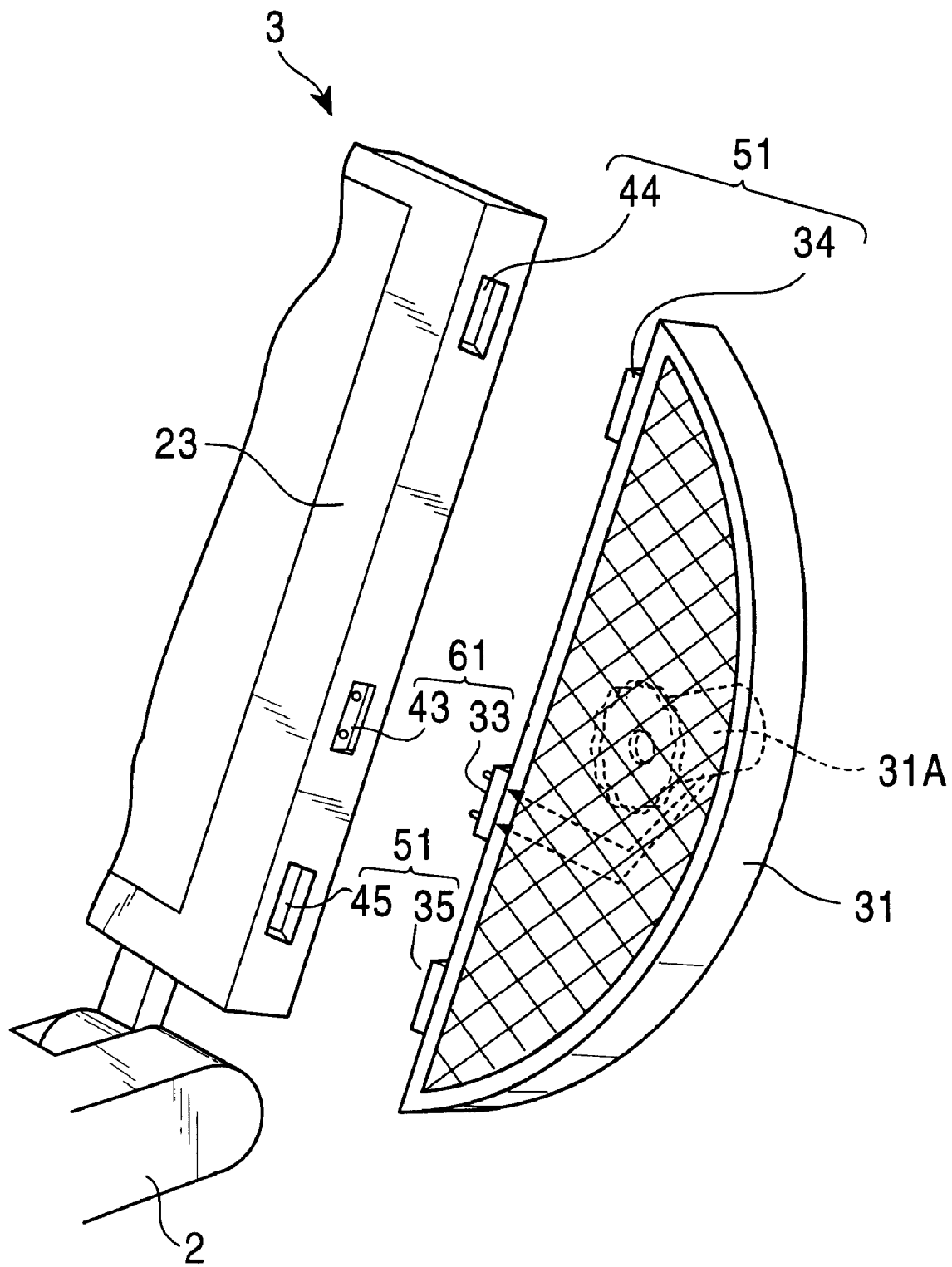
FIG. 3 illustrates the display portion and the right speaker of the portable computer.

The speakers 30 and 31 are symmetically formed on the left and right side portions of the electronic device, and have substantially the same structure. FIG. 3 shows the right speaker 31 having mounted therein a speaker body 31A. Similarly, the speaker 30 has mounted therein a speaker body 31A. Each speaker body 31A is electrically connected to an electrically connecting terminal 33 associated thereto.

Protrusions 34 and 35 are provided, respectively, at the upper and lower portions of the speaker 31. Similarly, protrusions 34 and 35 are provided at the upper and lower portions of the speaker 30.

As shown in FIGS. 2 and 3, recesses 44 and 45 and an electrically connecting terminal 43 are provided at each of the left side 22 and the right side 23.

The recesses 44 and 45, at the left side 22 of the display portion 3, and the protrusions 34 and 35 of the speaker 30 form holding means 50 for mechanically and removably holding an accessory with respect to the display portion 3. Similarly, recesses 44 and 45, at the right side 23 of the display portion 3, and the protrusions 34 and 35 of the speaker 31 form holding means 51 for mechanically and removably holding another accessory with respect to the display portion.

In FIG. 2, the recessed electrically connecting terminal 43, at the left side 22 of the display portion 3, and the protruding electrically connecting terminal 33 of the speaker 30 form an electrically connecting means 60 for electrically connecting the speaker 30 to the display portion 3. Similarly, the recessed electrically connecting terminal 43, at the right side 23 of the display portion 3, and the protruding electrically connecting terminal 33 of the speaker 31 form an electrically connecting means 61 for electrically and removably connecting the speaker 31 to the display portion 3.

Figure 6:
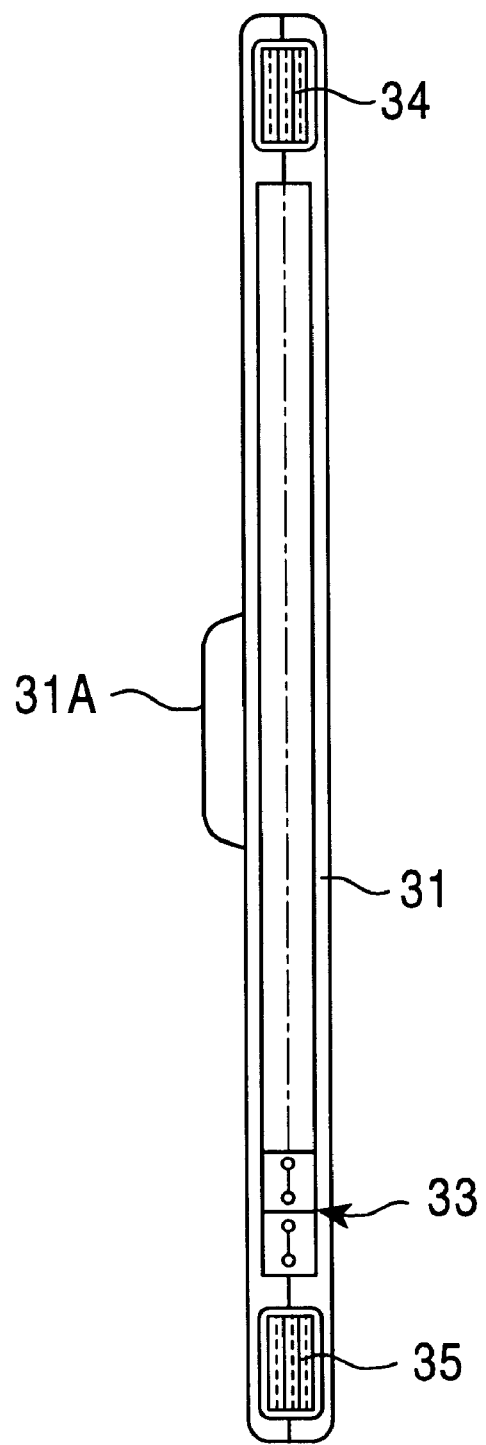
FIG. 6 is a side view of the right speaker.
Figure 7:
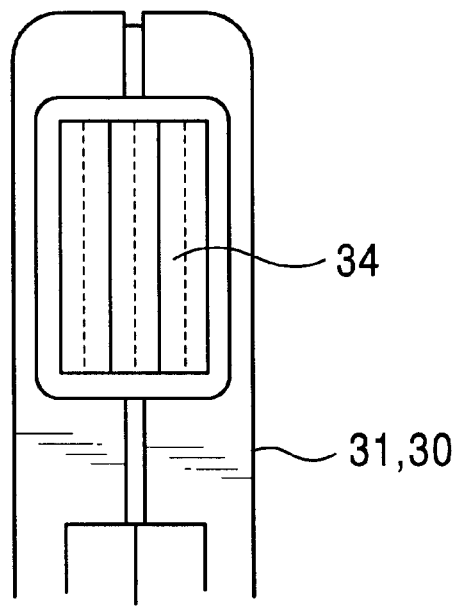
FIG. 7 illustrates one of the protrusions of the right or the left speaker.
Figure 8:
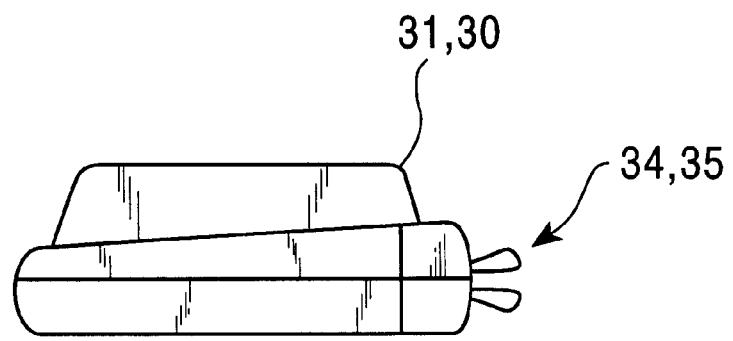
FIG. 8 is a plan view of the protrusions of the right or the left speaker.

FIGS. 4 to 6 show an example of the structure of the speaker 31 of FIG. 1. FIG. 7 is an enlarged view of the protrusion 34. FIG. 8 shows the protrusions 34 and 35 in a plane.

Figure 9:
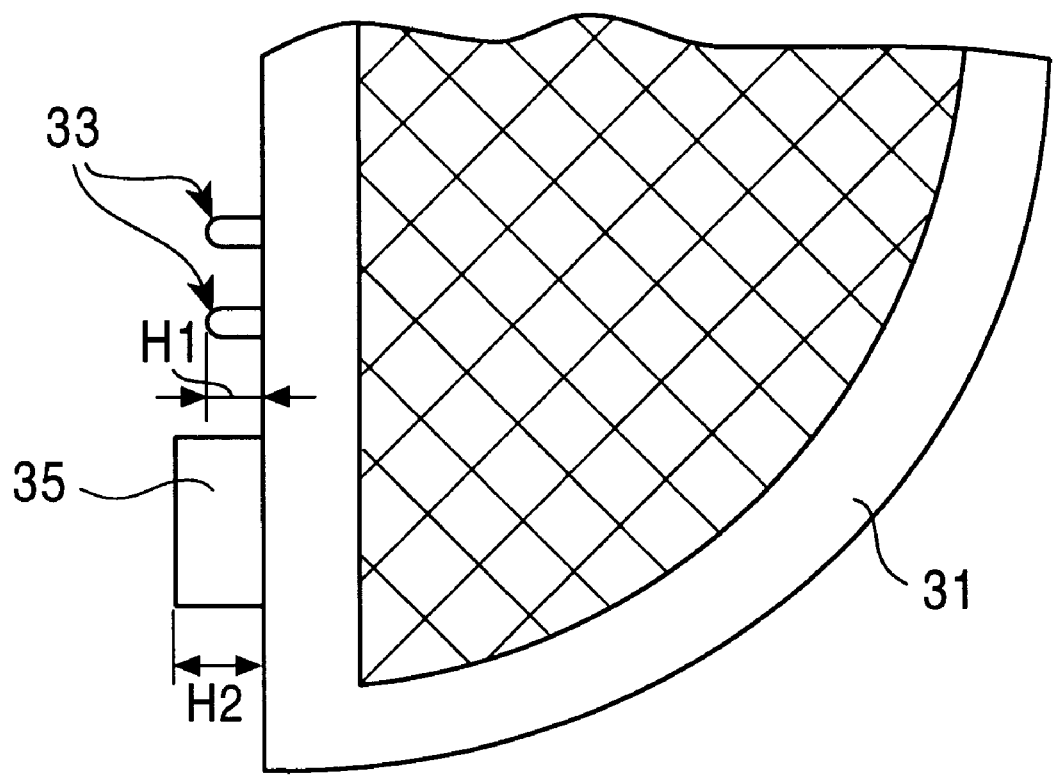
FIG. 9 illustrates the positional relationship between one of the protrusions and an electronic terminal of the right speaker.
Figure 10:
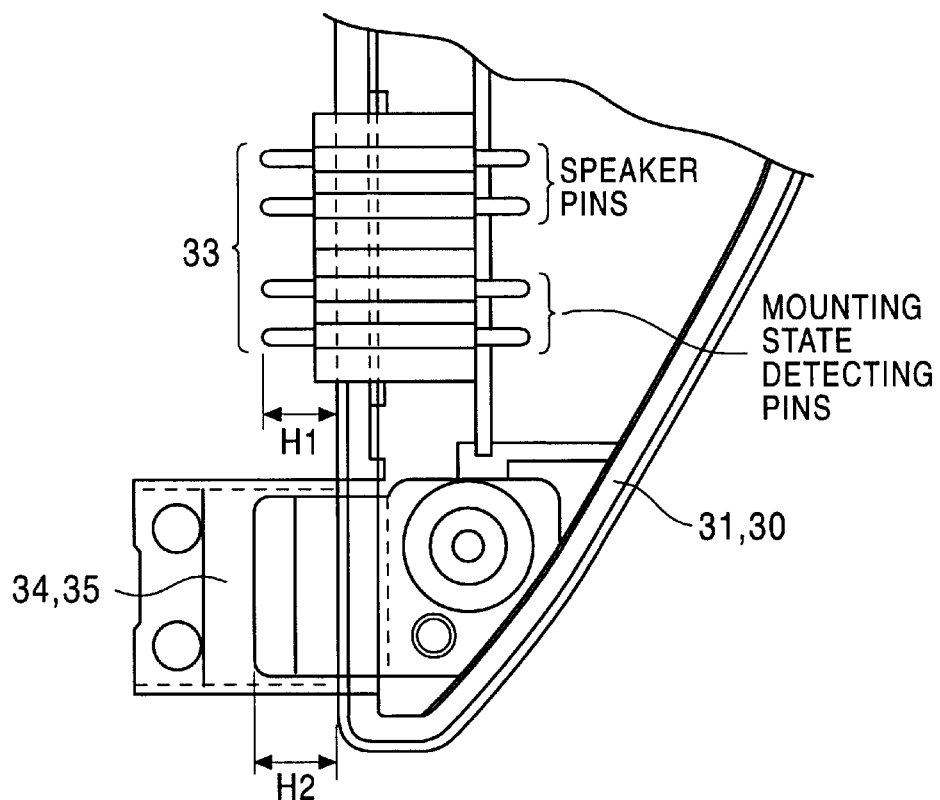
FIG. 10 illustrates in detail one of the protrusions (or the other protrusion) and the electrical terminal of the right or the left speaker.

As shown in FIGS. 9 and 10, the electrically connecting terminal 33 of the speaker 31 (as well as the electrically connecting terminal 33 of the speaker 30) may be a two-pin type or a four-pin type terminal. In FIG. 9 that shows the speaker 31, the amount of protrusion H1 of the electrically connecting terminal 33 is smaller than the amount of protrusion H2 of the protrusion 35. In the case where the amount of protrusion H1 is smaller than the amount of protrusion H2, when the speaker 31 is placed on, for example, a desk, the protrusion 35 first contacts the desk, so that the electrically connecting terminal 33 does not directly contact the desk. Therefore, the protrusion 35 protects the electrically connecting terminal 33. (The same is true for the speaker 30.)

Similarly with the two-pin type electronic connecting terminal 33 shown in FIG. 3, in the four-pin type electronic connecting terminal 33 of the speaker 31 shown in FIG. 10, two of the four pins are used for connection to a speaker body 31A while the other two pins are used for detecting the condition of mounting of the speaker 31. This allows a voice signal, which has been supplied to a speaker (not shown) built in the body 2 of the computer 100, to be automatically supplied to the speaker 31, by simply mounting the speaker 31 to the computer 100. (The same is true for the speaker 30.)

Figure 11:
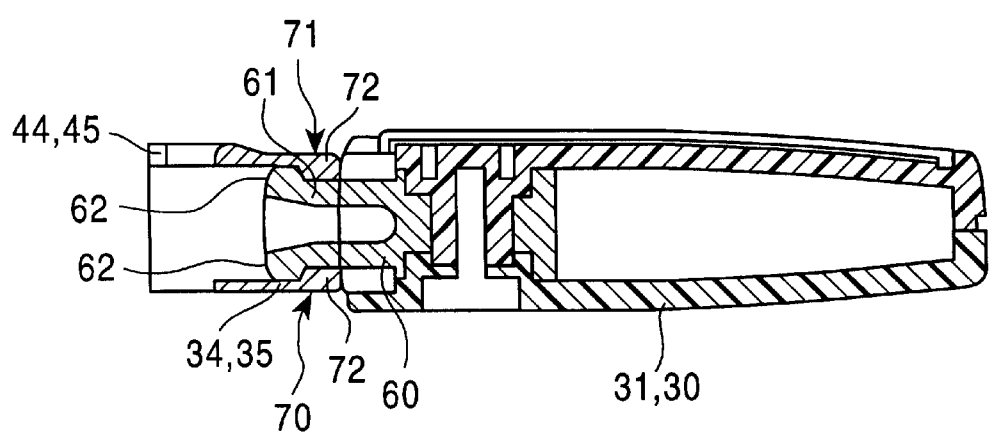
FIG. 11 is a sectional view of one of the protrusions (or the other protrusion) of the right or the left speaker and one of the recesses (or the other recess) in the right or the left side of the display portion.

As shown in FIGS. 8 and 11, the protrusions 34 and the protrusions 35 of FIG. 1 each have tongues 60 and 61. The tongues 60 and 61 each have at one end thereof, a bulging portion 62 that bulges outward.

As shown in FIG. 11, the recesses 44 at the left side 22 and the right side 23, as well as the recesses 45 at the left side 22 and the right side 23, of FIG. 1 are shaped to allow engagement with their respective bulging portions 62 of the tongues 60 and 61. More specifically, the recesses 44, as well as the recesses 45, each have bulging portions 72 that bulge inwardly of their respective portions 70 and 71.

Therefore, the speakers 30 and 31 can be removably fitted to the computer 100 by fitting the tongues 60 and 61 of the protrusions 34 and 35 into the portions 70 and 71 of the recesses 44 and 45 at the left side and the right side of the computer 100 to engage the bulging portions 62 of the protrusions 34 and 35 and their corresponding bulging portions 72 of the recesses 44 and 45.

A simple description will now be given of the method of mounting the speakers 30 and 31 to the display portion 3, with reference to FIGS. 1 and 2.

The protrusions 34 and 35 of the speaker 30 are positioned in correspondence with and fitted, in the direction of double-headed arrow R, into the recesses 44 and 45 at the left side 22, whereas the protrusions 34 and 35 of the speaker 31 are positioned in correspondence with and fitted, in the direction of the double-headed arrow R, into the recesses 44 and 45 at the right side 23. When this is being done, the electrically connecting terminal 33 of the speaker 30 can be electrically connected to the electrically connecting terminal 43 at the left side 22, whereas the electrically connecting terminal 33 of the speaker 31 can be electrically connected to the electrically connecting terminal 43 at the right side 23. FIG. 11 shows the speaker 30 (or the speaker 30) mounted to the display portion 3.

The speakers 30 and 31 can be removed from the display portion 3 by simply pulling the speakers 30 and 31 in the direction of the double-headed arrow R of FIG. 1.

Even when an external force is applied to the speakers 30 and 31 that are mounted to the display portion 3, the speakers 30 and 31 are relatively easily removed from the display portion 3, thereby preventing undesired forces from being exerted on the display portion 3 and damaging it.

The speakers 30 and 31, the protrusions 34 and 35, and the recesses 44 and 45 may, for example, be made of resin or plastic.

A description will now be given of another form of the holding means, with reference to FIGS. 12 and 13. These figures show a form of the holding means of the speakers 30 and 31 of FIGS. 1 and 2.

The holding means 150 makes use of magnetic attractive force. As shown in FIGS. 12 and 13, the speaker 31 (and the speaker 30) each have protrusions 134 with two iron portions 134A and 134B, between which two iron portions 134A and 134B is provided a magnet 134C. (The protrusions 135 of the speakers 30 and 31 have the same structure.)

Figure 12:
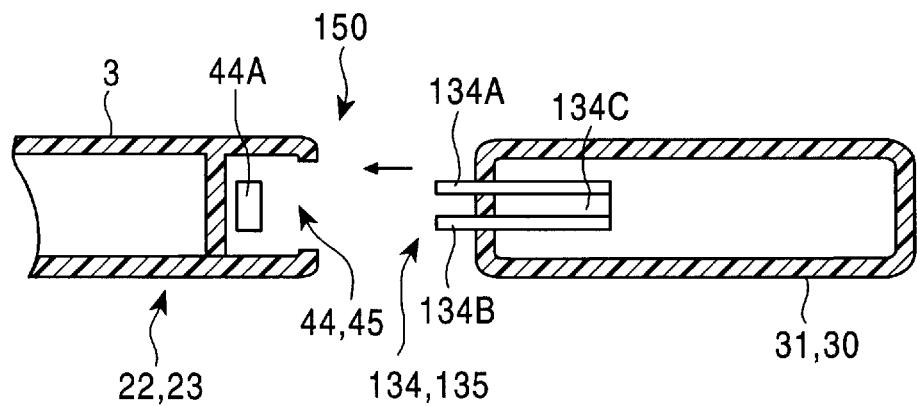
FIG. 12 illustrates a form of the holding means, which shows one of the recesses (or the other recess) in the right or the left side of the display and one of the protrusions (or the other protrusion) of the right or the left speaker.
Figure 13:
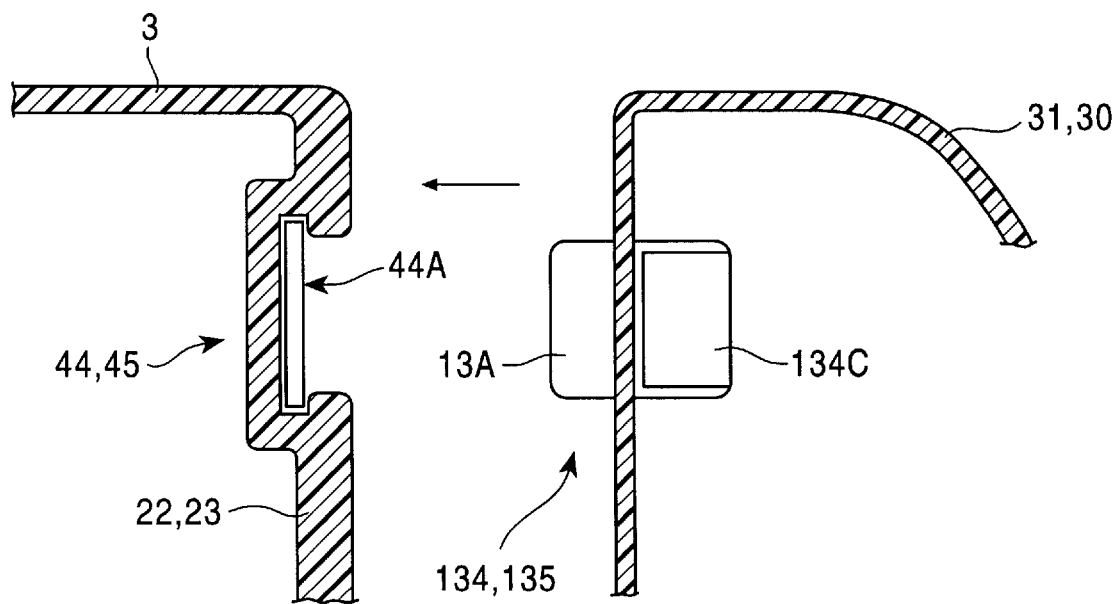
FIG. 13 illustrates another form of the holding means, which shows one of the recesses (or the other recess) in the right or the left side of the display and one of the protrusions (or the other protrusion) of the right or the left speaker of FIG. 12, as viewed from a different angle.

As shown in FIGS. 12 and 13, an iron plate 44 is disposed in the recesses 44 at the left side 22 and at the right side 23, of the display portion 3. (An iron plate is similarly disposed in the recesses 45 at the left side 22 and at the right side 23.) Bringing the iron portions 134A and 134B of each protrusion 134 causes the associated iron plate 44A of each recess 44 to be magnetically attracted to the associated iron portions 134A and 134B of each protrusion 134. (This also applies to the iron portions of each protrusion 135.) This allows the speakers 30 and 31 to be removably secured to the display portion 3.

A description will now be given of still another form of the holding means, with reference to FIGS. 14 and 15.

Figure 14:
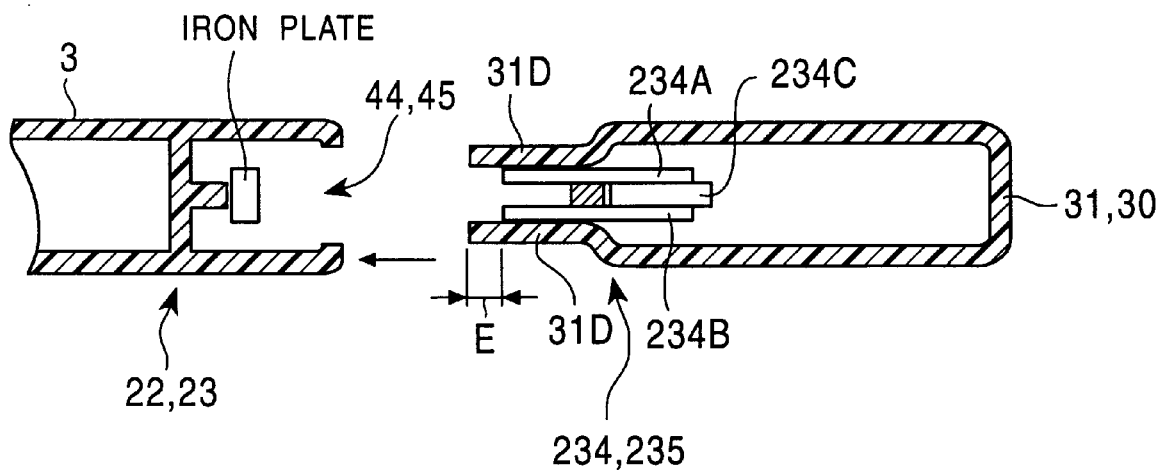
FIG. 14 illustrates still another form of the holding means, which shows one of the recesses (or the other recess) in the right or the left side of the display and one of the protrusions (or the other protrusion) of the right or the left speaker in accordance with the present invention.
Figure 15:
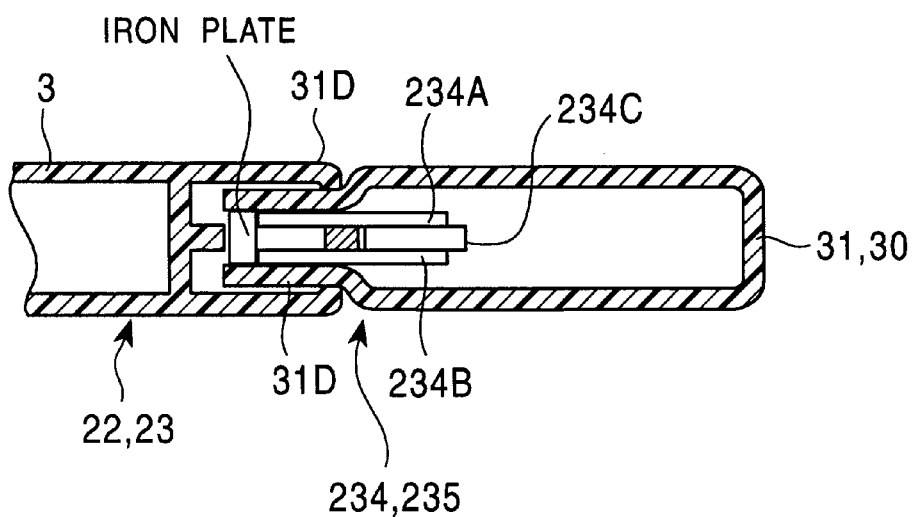
FIG. 15 illustrates the recesses and the corresponding protrusions of FIG. 14 in a connected state.

FIGS. 14 and 15 correspond to FIGS. 12 and 13. The holding means of FIGS. 14 and 15 also makes use of magnetic attractive force. The structure of the recesses 44 and 45 of the display portion 3 is substantially the same as the structure of the recesses 44 and 45 shown in FIG. 12. However, there is a slight difference in the structure of the protrusions 234 and the protrusions 235 of the speaker 30 and 31. In the structure of FIGS. 14 and 15, a magnet 234C is disposed between the iron portions 234A and 234B of each protrusion 234. (A magnet is also disposed between the iron portions of each protrusion 235.) The speaker 31 has resin portions 31D, which protrude at the outer sides of the iron portions 234A and 234B. (The speaker 30 also has similar resin portions.)

The resin portions 31D are positioned at the outer sides of the iron portions 234A and 234B of each protrusion 234. The amount of protrusion of the protruding resin portions 31D is greater than that of the iron portions 234A and 234B at the outer sides, by an amount equal to E. As a result, the resin portions 31D of each protrusion 234 hides and protects the iron portions 234A and 234B of each protrusion 234. Consequently, even when the speakers 30 and 31, which have been removed from the display portion, are placed on, for example, a desk, the iron portions 234A and 234B of each protrusion 234 do not directly contact the desk, thereby preventing them from magnetically and electrically affecting other devices.

A description will now be given of another form of accessory mounting in accordance with the present invention, with reference to FIGS. 16 to 18.

Figure 16:
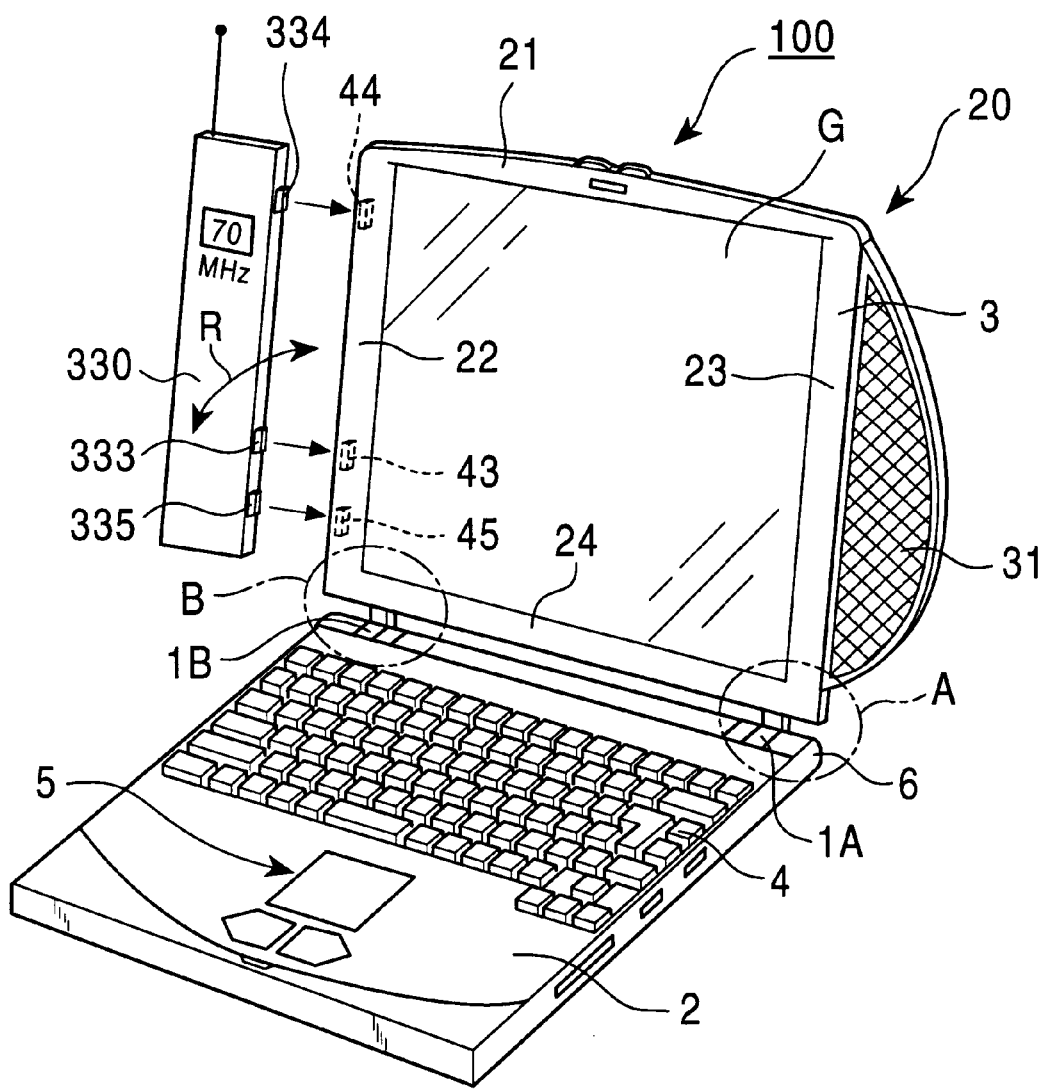
FIG. 16 illustrates another form of accessory mounting in the electronic device of the present invention.

In FIG. 16, the speaker 31 is mounted to the right side 23 of the display portion 3, whereas another type of accessory, such as a portable telephone, is mechanically and electrically connected to the left side 22 of the display portion 3 so that the portable telephone can be removed from the left side 22. The accessory 330, such as a portable telephone or a radio device, has protrusions 334 and 335 as well as a protruding electrically connecting terminal 333. The protrusions 334 and 335 can be mechanically fitted to and held by their respective recesses 44 and 45 at the left side 22 of the display portion 3, and the electrically connecting terminal 333 can be electrically connected to the electrically connecting terminal 43 at the left side 22.

Figure 17:
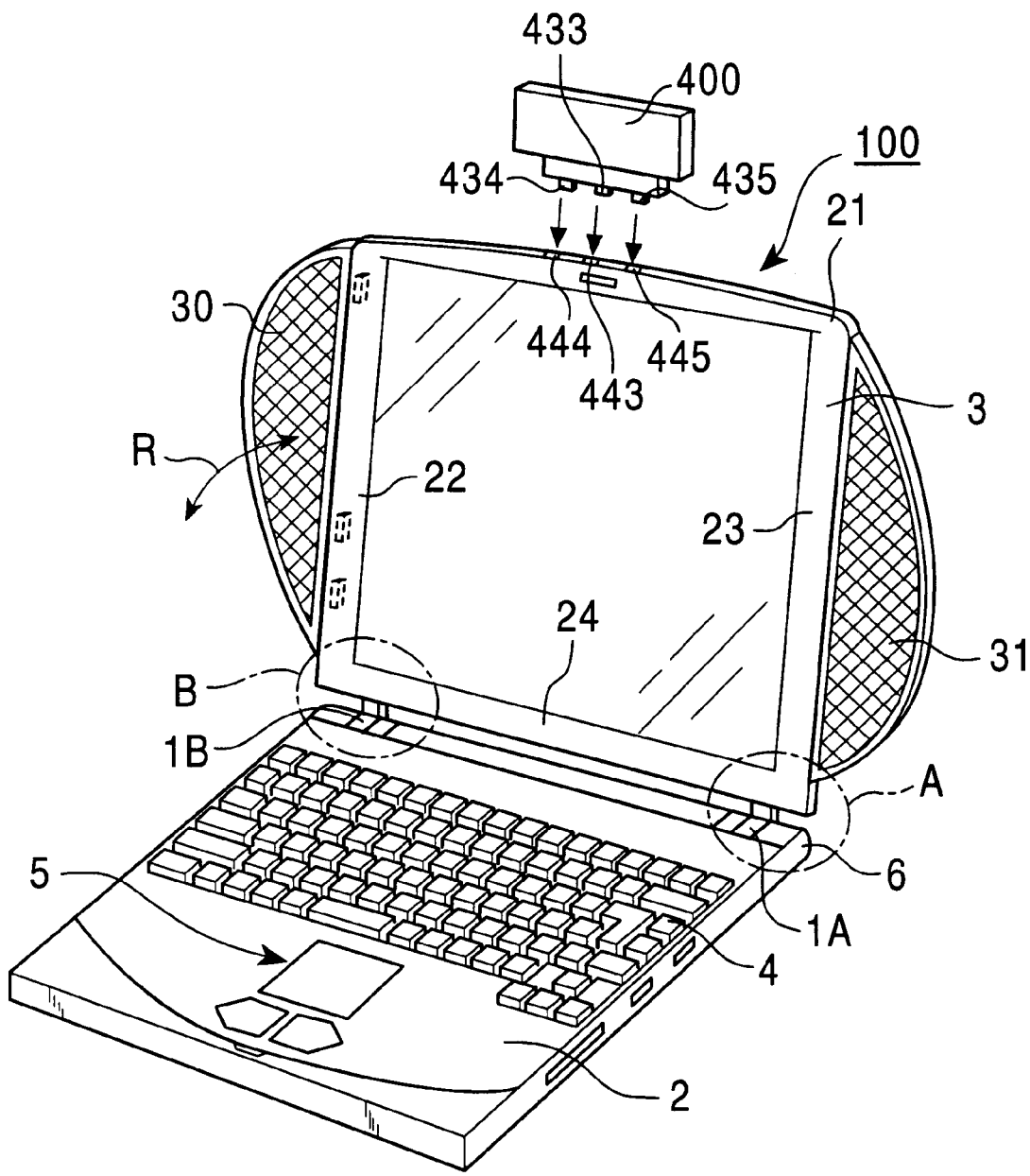
FIG. 17 illustrates still another form of accessory mounting in the electronic device of the present invention.

In the example of accessory mounting in FIG. 17, a stereo microphone 400 is mounted to the top side 21 of the display portion 3, in addition to the speakers 30 and 31 that are mounted, respectively, to the left side 22 and the right side 23 of the display portion 3. The stereo microphone 400 has protrusions 434 and 435 as well as a protruding electrically connecting terminal 433.

The top side 21 of the display portion 3 has recesses 444 and 445 as well as a recessed electrically connecting terminal 443. The protrusions 434 and 435 of the microphone 400 can be fitted to the corresponding recesses 444 and 445 of the top side 21, while the electrically connecting terminal 433 can be electrically connected to the protruding electrically connecting terminal 443.

Figure 18:
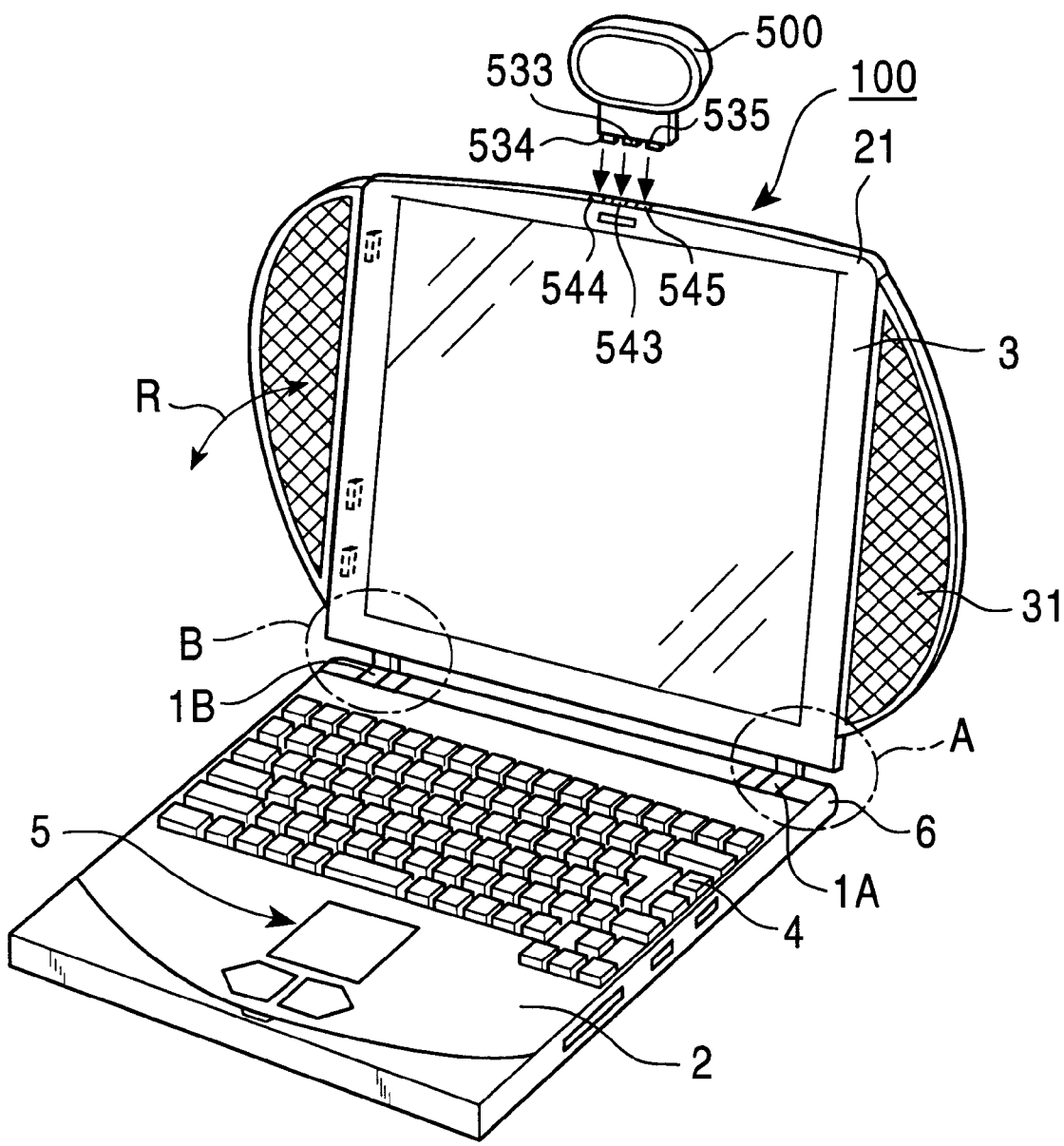
FIG. 18 illustrates still another form of accessory mounting in the electronic device of the present invention.

In the example of accessory mounting in FIG. 18, an image pickup camera, such as a CCD (charge-coupled device) camera 500, is mounted to the top side 21 of the display portion 3. The image pickup camera 500 has protrusions 534 and 535 as well as an electrically connecting terminal 533. The top side 21 has, as mentioned above, recesses 544 and 545 and a recessed electrically connecting terminal 543. The protrusions 534 and 535 of the microphone 500 can be mechanically fitted to and held by the recesses 544 and 545 of the top side 21, respectively, and the electrically connecting terminal 533 can be fitted and electrically connected to the electrically connecting terminal 543.

It is to be noted the present invention is not limited to the above-described forms.

Although in the above-described forms of the holding means, such as the form shown in FIG. 11, the protrusions are shaped so that they can be snappingly fitted to their corresponding recesses, the protrusions may be shaped differently. In addition, although in the above-described embodiment a portable computer was used as the portable electronic device, other portable electronic devices, such as a portable information terminal, may also be used in other embodiments.

Further, although in the foregoing description a speaker, a camera, a microphone, and a radio device or portable telephone, were used as accessory, other types of accessories may obviously be used.

Although in the foregoing description the protrusions were formed at the accessories, such as the speakers 30 and 31, and the recesses were formed in the display portion 3, the protrusions may be formed in the display portion 3 and the recesses may be formed in the accessories.

As can be understood from the foregoing description, according to the present invention, accessories can be removably provided at external surfaces, around the display screen, of the display portion.

What is claimed is:

1. A portable electronic device, comprising:

a body;

a display portion openable and closeable with respect to said body;

holding means, provided at an external surface, around a display screen, of said display portion, for mechanically and removably holding an accessory, said holding means comprising a recess in said display portion for fitting thereinto a protrusion of the accessory; and electrically connecting means for electrically and removably connecting the accessory to the display portion; and wherein said protrusion of said accessory includes a magnet which is magnetically attracted to a metal portion of said recess of said display portion so as to removably secure said accessory to said display portion.

2. An electronic device according to claim 1, wherein said electrically connecting means, for electrically connecting the accessory, is a recessed electrically connecting terminal portion for fitting thereto a protruding electrically connecting terminal of the accessory.

3. An electronic device according to claim 1, wherein said recess, serving as said holding means, for mechanically holding the accessory, and the protrusion of the accessory are made of resin.

4. An electronic device according to claim 1, wherein the magnet of the protrusion of the accessory is covered with an electrically and magnetically insulated cover.

5. An electronic device according to claim 1, wherein said electronic device is a portable computer.

6. An electronic device according to claim 2, wherein the amount of protrusion of the protruding electrically connecting terminal of the accessory is smaller than the amount of protrusion of the protrusion of the accessory.

7. An electronic device according to claim 2, wherein said recess, serving as said holding means, for mechanically holding the accessory, and the protrusion of the accessory are made of resin.

* * * * *